(12) United States Patent
Grigoryants

(10) Patent No.: US 12,280,440 B2
(45) Date of Patent: Apr. 22, 2025

(54) THREAD CLEANING DEVICE

(71) Applicant: Yuri Grigoryants, Glendale, CA (US)

(72) Inventor: Yuri Grigoryants, Glendale, CA (US)

( * ) Notice: Subject to any disclaimer, the term of this patent is extended or adjusted under 35 U.S.C. 154(b) by 178 days.

(21) Appl. No.: 17/733,930

(22) Filed: Apr. 29, 2022

(65) Prior Publication Data
US 2022/0347775 A1 Nov. 3, 2022

Related U.S. Application Data

(60) Provisional application No. 63/181,242, filed on Apr. 29, 2021.

(51) Int. Cl.
| | | |
|---|---|---|
| *B23G 9/00* | (2006.01) | |
| *B08B 1/12* | (2024.01) | |
| *B08B 1/32* | (2024.01) | |
| *B08B 9/02* | (2006.01) | |

(52) U.S. Cl.
CPC ........... *B23G 9/009* (2013.01); *B08B 1/12* (2024.01); *B08B 1/32* (2024.01); *B08B 9/021* (2013.01)

(58) Field of Classification Search
CPC .......... B08B 9/023; B08B 1/32; B08B 9/021; B08B 9/057; A46B 13/001; A46B 13/02; B25B 7/02; B23G 9/009
See application file for complete search history.

(56) References Cited

U.S. PATENT DOCUMENTS

| | | | |
|---|---|---|---|
| 4,530,127 A | 7/1985 | Roberts | |
| 5,157,802 A | 10/1992 | Guidry et al. | |
| 6,464,592 B1 | 10/2002 | Quast | |
| 6,983,508 B2 | 1/2006 | Saurer | |
| 2004/0031112 A1* | 2/2004 | Saurer | B08B 9/021 15/4 |
| 2013/0045662 A1* | 2/2013 | Heilian | B24D 11/00 451/28 |

* cited by examiner

*Primary Examiner* — Shay Karls
(74) *Attorney, Agent, or Firm* — Law Office of Craig Bohn; Craig E. Bohn

(57) ABSTRACT

A thread cleaner comprising an elongated body with a drive end and an open end, with an abrasive section, a scraper section, and a brush section at the open end, the scraper section intermediate the abrasive section and the brush section, the scraper section, and brush sections oriented to apply radial scraping and brushing force to an elongated workpiece positioned in alignment with the thread cleaner's central axis, and the abrasive section oriented to apply abrasive force perpendicular to the thread cleaner's central axis to a surface workpiece.

8 Claims, 3 Drawing Sheets

THREAD CLEANING DEVICE

CROSS-REFERENCE TO RELATED APPLICATIONS

This application claims the benefit of U.S. Application No. 63/181,242, filed on Apr. 29, 2021, by the present inventor, entitled "Thread Cleaning Device," which is hereby incorporated by reference in its entirety for all allowable purposes, including the incorporation and preservation of any and all rights to the patentable subject matter of the inventor, such as features, elements, processes and process steps, and improvements that may supplement or relate to the subject matter described herein.

STATEMENT REGARDING FEDERALLY SPONSORED RESEARCH OR DEVELOPMENT

Not Applicable

BACKGROUND OF THE INVENTION

This invention relates generally to a thread cleaner for cleaning concrete residue from a threaded bolt, and more specifically a thread cleaner that incorporates both a scraping action and a brushing action to break up, dislodge, and sweep concrete debris from the threads of a metal bolt.

There exists a need in the construction industry for a faster more efficient and consistent quality way to clean exposed screw threads that have been permanently installed into a structure. Metal studs that have been cast into concrete, for example, are usually contaminated with dried concrete and dirt which need to be cleaned well enough to allow a nut to be screwed down onto it. Such studs may be referred herein as bolts, fasteners, threaded studs, or a "elongated workpiece". An exemplary elongated workpiece is shown in FIG. 5. A current practice to accomplish the cleaning of the threads of an elongated workpiece is by having a worker use a spinning wire wheel or brush attached to a portable drill or grinder, and hold it against the sides of the threaded stud, circling it as necessary to clean the debris off of it. This is time-consuming and back-breaking work, and results in inconsistent quality. Additionally, it is typically necessary for the surface of the concrete, where the stud protrudes from the concrete, to be flat and free of surface imperfections. This surface adjacent to the stud may be referred herein as a "surface workpiece". A current practice is to use a handheld grinder with an abrasive disc to grind off high spots in a surface workpiece. This again is also time-consuming and inconsistent.

It would be an improvement to the field of art to have a thread cleaning device in the form of a tube or cylinder that may be inserted over a fixed thread, and by a rotary action, either partially or fully circular, both clean the threads of the construction debris and grind the surrounding surface flat in one operation. It would also be an improvement to the field of art that that device may be powerable by a portable power tool. It would also be an improvement to the field of art for the cleaning and abrading components of the device to be replaceable.

It would be an improvement to the field of art that the tube-structured thread cleaning device may have a first section comprising internal pointed protrusions, the tips of which have an inside diameter just slightly larger than the outside diameter of the threads to be cleaned. The pointed protrusions may scrape, break up, and loosen the concrete, leaving some remnant of the loose debris inside the threads. It would be an improvement to the field of art to provide a thread cleaning device that may also have a second section comprising an internal wire wheel structure with bristles pointing inward. The inside diameter of the bristles may be smaller than the outside diameter of the threaded stud. This section may clean the debris from the inside of the threads. It would be an improvement to the field of art that a thread cleaning device may also have an additional component surrounding the opening of the hollow tube structure that may have a broader diameter and possess an abrasive surface oriented perpendicular to the pointed protrusions and bristles, to grind the area surrounding the stud flat. It would also be an improvement to the field of art for the cleaning and abrading components of the device to be replaceable.

DESCRIPTION OF THE EXEMPLARY EMBODIMENTS

Figure 1:
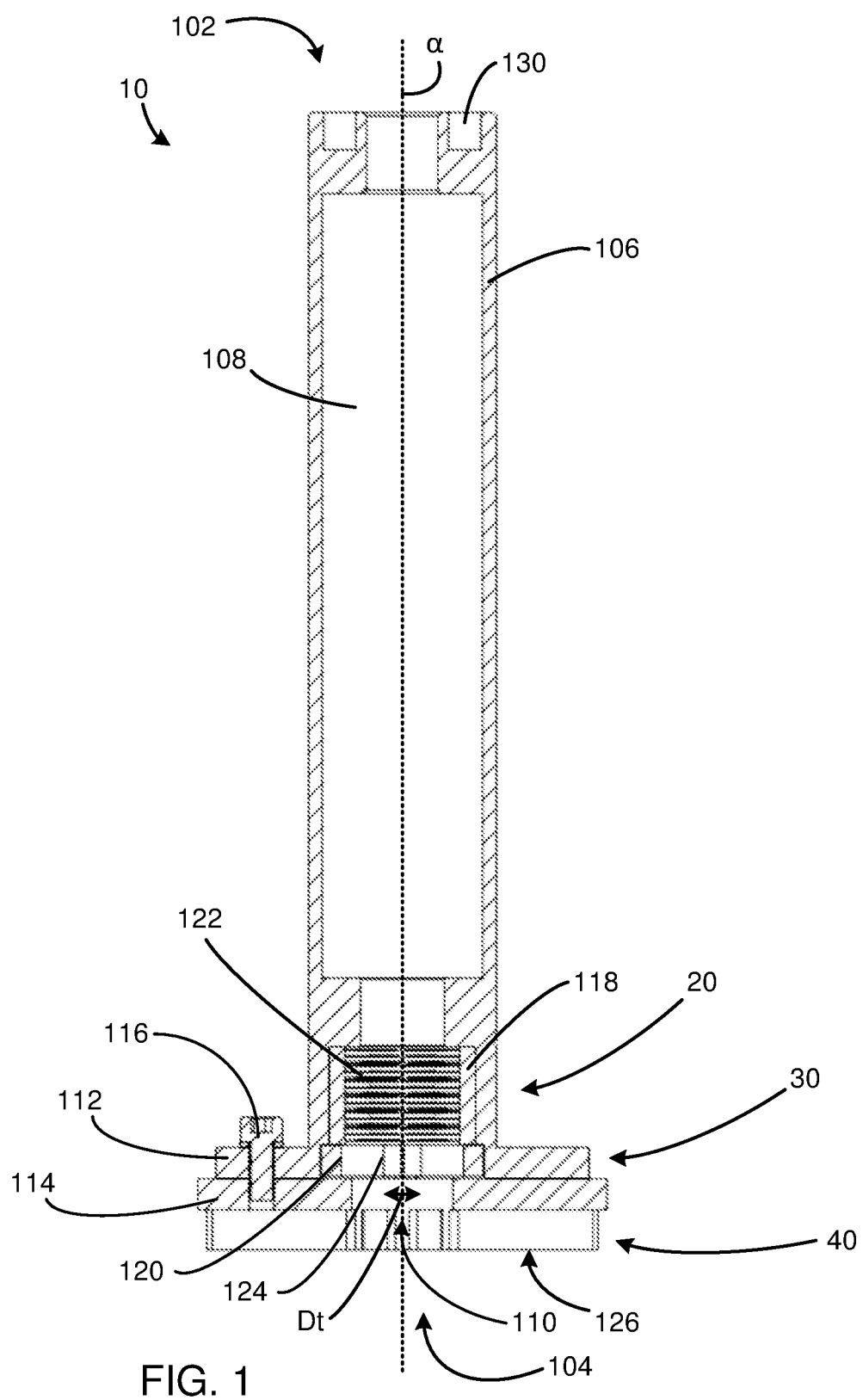
FIG. 1 is a cross-sectional side view of an exemplary thread cleaner device according to the present invention.
Figure 2:
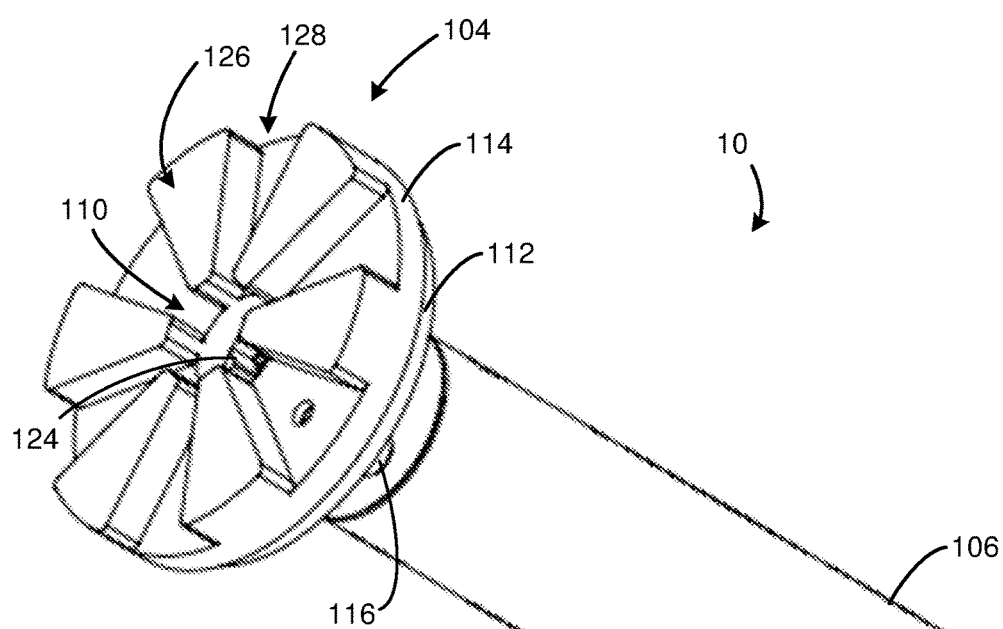
FIG. 2 is a perspective view of the exemplary thread cleaner device of FIG. 1.
Figure 3:
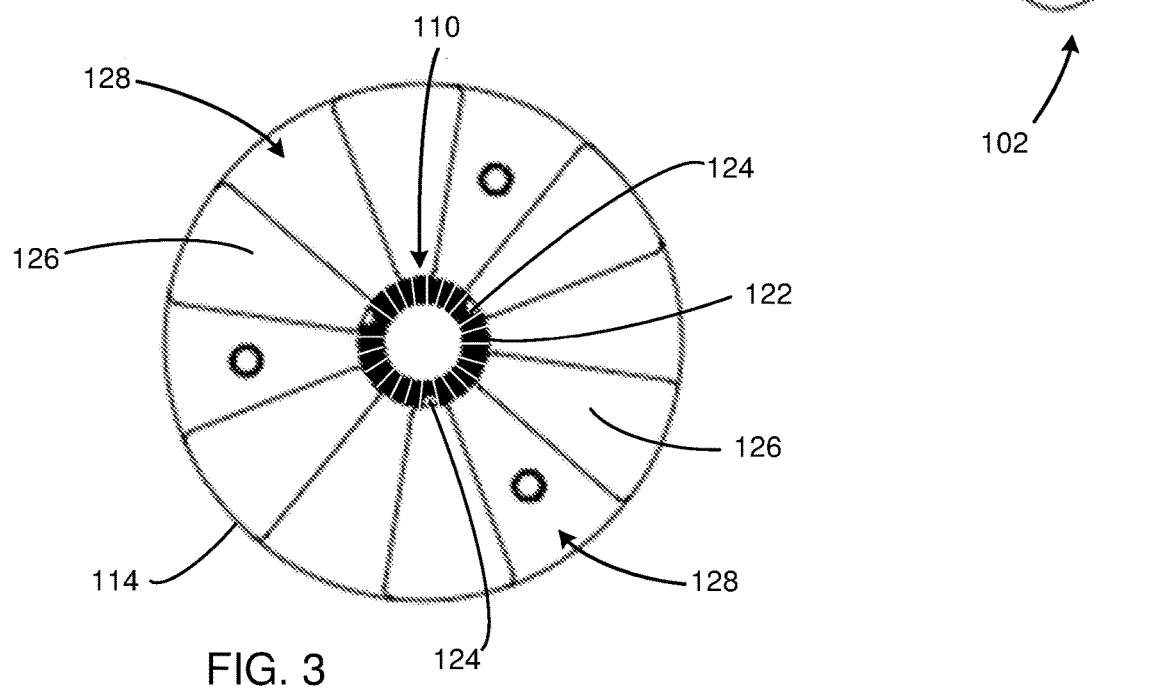
FIG. 3 is a schematic open end view of the exemplary thread cleaner device shown in FIGS. 1 and 2.

Referring now primarily to FIGS. 1 through 3, an exemplary embodiment of a thread cleaning 10 device is shown. In the exemplary embodiment, thread cleaner 10 is shown to have a drive end 102 and an open end 104. In the exemplary embodiment, an elongated cylinder 106 extends from the drive end 102 toward the open end 104. In the exemplary embodiment, cylinder 106 has a hollow core 108, into which an elongated workpiece 500 may extend from the open end 104, through core entrance 110. The exemplary cylinder 106 may be constructed of a material sufficiently strong to support appropriate cleaning pressures, such as metal, and a length that may be sufficiently long to allow the tool to completely cover the length of the bolt, stud, or threaded item 500 to be cleaned. The length of cylinder 106 may be longer than necessary for stud cleaning purposes in order to position the attached power tool at a comfortable work height for the operator.

The exemplary cylinder 106 and thread cleaner 10 may have a common axis α, around which the cylinder 106 and the entire thread cleaner 10, may rotate. Herein, the term "rotation" or "rotate" may mean a complete 360-degree rotation or a segment of a complete rotation, and rotational motion may go in either direction around axis α.

In the exemplary embodiment, a thread cleaner 10 is shown with a brush section 20, a scraper section 30, and an abrasive section 40. In the exemplary embodiment, each of the brush section 20, the scraper section 30, and the abrasive section 40 may also be oriented around axis α, and may correspondingly rotate with the rotation of the cylinder 106 around the axis α. In the exemplary embodiment, the brush section 20 may be positioned within the cylinder 106, distal the drive end 102. In the exemplary embodiment, the brush section 20 may comprise a cylindrical brush module 118, which fits within the cylinder 106, oriented to be rotated around axis α. In the exemplary embodiment, brush module 118 may comprise an array of wire bristles, arranged as cylindrical brushes 122, oriented to be rotated around axis α. In the exemplary embodiment, the brushes 122 may be arranged closely enough to impart a forceful brushing action when rotated on an elongated workpiece 500 positioned coaxially with axis α adequate, in order to remove remnants of concrete from the threads 504 of the elongated workpiece 500. In this disclosure, the force the brushes 122 impart on the elongated workpiece 500 is described as "tangential".

In the exemplary embodiment, the scraper section 30 may be positioned proximate to the end of the cylinder 106 distal the drive end 102. In the exemplary embodiment, the brush section 20 is positioned intermediate the drive end 102 and the scraper section 30. In the exemplary embodiment, the scraper section 30 may comprise a flange 112 area of increased diameter on cylinder 106. In the exemplary embodiment, flange 112 may provide a suitable securement surface for attachment of the abrasive section 40 to the exemplary thread cleaner 10. In the exemplary embodiment, the abrasive section 40 is secured to the flange 112, and thereby the balance of the exemplary thread cleaner 10, but an assembly screw 116. In the exemplary embodiment, a plurality of assembly screws 116 are provided.

In the exemplary embodiment, the scraper section 30 may comprise a scraper module 120, which fits with the flange 112 of the cylinder 106. The scraper module 120 may comprise at least one tooth 124. In the exemplary embodiment, a plurality of teeth 124 may be oriented to be rotated around axis α. In the exemplary embodiment, the at least one tooth 124 may be arranged closely enough to axis α to impart a forceful scraping action when rotated on an elongated workpiece 500 positioned coaxially with axis α adequate, in order to break up and dislodge concrete from the threads 504 of the an elongated workpiece 500. The number of teeth 124 in the exemplary embodiment is three, which provides balanced scraping action, however, other numbers may be suitable. In the exemplary embodiment, the inside diameter Dt of the teeth 124 may be precisely set and may correspond to the diameter of the elongated workpiece 500 to be cleaned. This means that the diameter of the elongated workpiece 500 will be slightly less than the inside diameter Dt of the teeth 124, and the teeth 124 would impinge upon unwanted concrete on the elongated workpiece 500 as the exemplary thread cleaner 10 is rotated.

In the exemplary embodiment, the abrasive section 40 may comprise an abrasive module 114 that may be selectively removable from the flange 112, and securable to the flange 112 with assembly screws 116. In the exemplary embodiment, the abrasive module 120 may be comprised of an abrasive surface 126 that is oriented perpendicular to axis α and away from drive end 102, with abrasive module 120 designed to rotate around axis α in conjunction with the scraper module 30 and cylinder 106. In the exemplary embodiment, the abrasive surface 126 may be coated with an abrasive material, which may include diamond, carbide, carborundum, boron carbide, garnet, quartz, crocus, emery, aluminum oxide, zirconia alumina, ceramic alumina, silicon carbide, and ceramic aluminum oxide, and mixtures thereof. In the exemplary embodiment, the abrasive module 120 may be comprised of a plurality of raised areas on which the abrasive surface 126 may be positioned, with a gap 128 intermediate a pair of raised area abrasive surfaces 126.

In the exemplary embodiment, the abrasive section 40 may be positioned proximate to the open end 104 distal the drive end 102. In the exemplary embodiment, the scraper section 30 is positioned intermediate the brush section 20 and the abrasive section 40. In the exemplary embodiment, the abrasive module 114 may have an exterior diameter at least as large as the flange 112, so that the abrasive module 114 may be secured to the flange 112. In the exemplary embodiment, the core entrance 110 passes through the abrasive module 114 at the axis α, and the diameter of the core entrance 110 in the abrasive module 114 may be less than the diameter of the scraper module 120, such that the scraper module 120 may not pass through the abrasive module 114, but that the abrasive module 114 may act to secure the scraper module 120 in place within the flange 112.

A thread cleaner 10 may be constructed to serve a particular size. In the exemplary embodiment, the thread cleaner 10 may have the size of the core entrance 110, the inside diameter Dt of the teeth 124, and the spacing of the brushes 122 coordinated to clean a particularly sized elongated workpiece 500.

An alternate exemplary embodiment of a thread cleaner 10 may be constructed to permit the replacement of the brush module 118 and the scraper module 120. In this fashion, a single thread cleaner 10 may be adapted to clean different sized elongated workpiece 500 by removing the abrasive module 114 by loosening the assembly screws 116, exposing the flange 112 and the scraper module 120 contained therein. The scraper module 120 may be removed to access the brush module 118 contained with the cylinder 106, but accessible through the core entrance 110, once the abrasive module 114 is removed.

Figure 4:
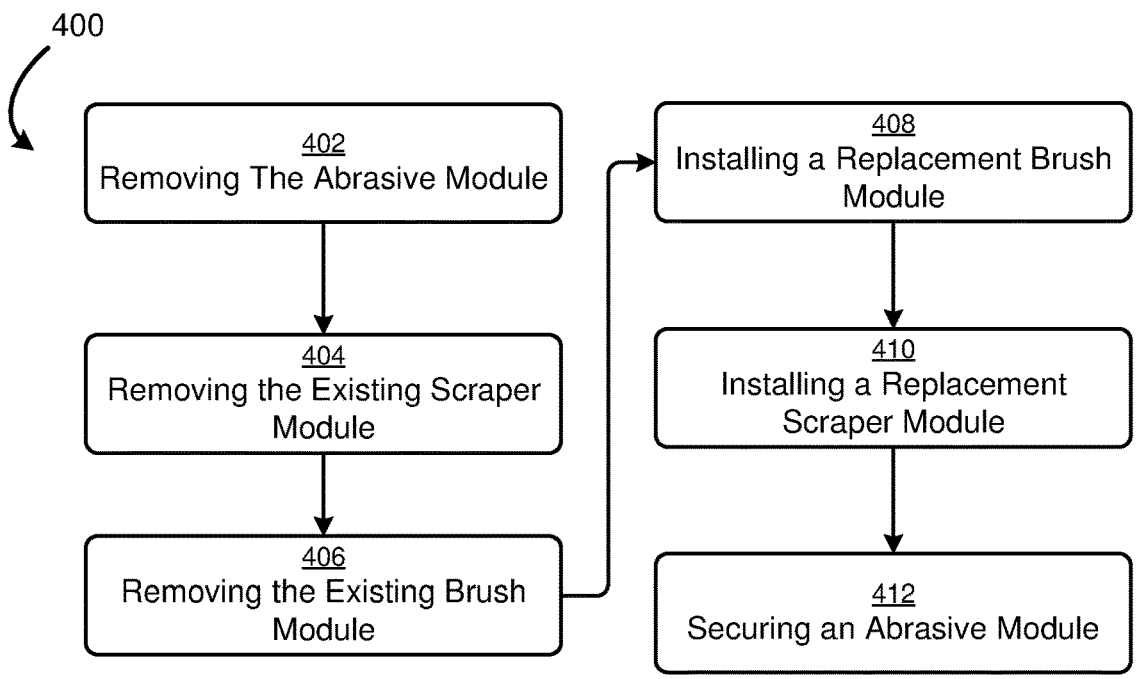
FIG. 4 is a system flow diagram of an exemplary process for modifying the size of a thread cleaner device according to the present invention.

Referring now to FIG. 4, the process (400) for adapting the functional size of a thread cleaner 10 may be seen as (402) removing the abrasive module 114, (404) removing the existing scraper module 120, (406) removing the existing brush module 118, (408) installing a replacement brush module 118 having a desired size, (410) installing a replacement scraper module 120 having a corresponding size to the replacement brush module 118, and (412) securing an abrasive module 114 with assembly screws 116 to secure all the components of the thread cleaner 10.

Figure 5:
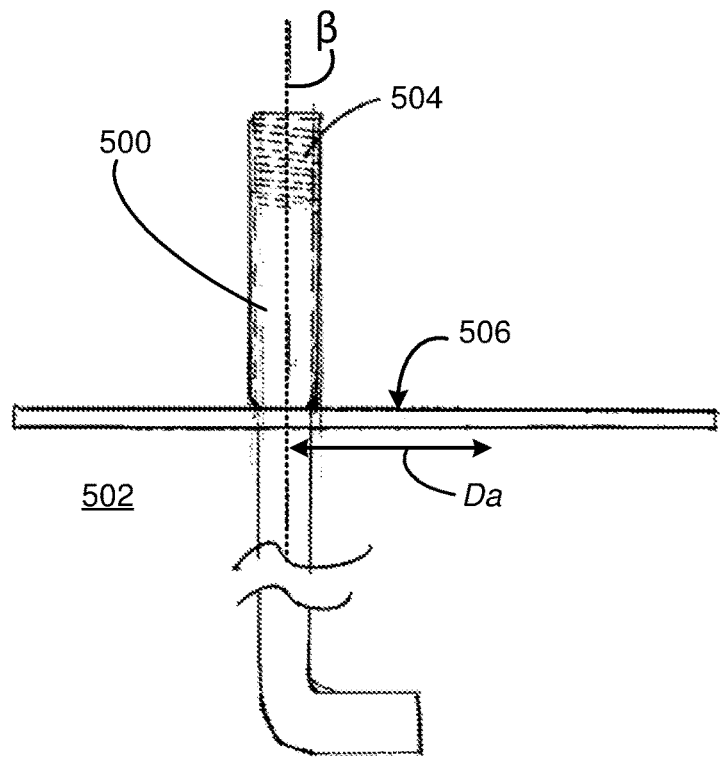
FIG. 5 is a schematic side view of an exemplary prior art elongated workpiece anchored within a body of concrete with a surface workpiece.

Referring now to FIG. 5, a prior art anchor bolt 500 is shown seated in concrete 502. Exemplary bolt 500 is shown to have a threaded section with threads 504 on the surface of bolt 500. Exemplary bolt 500 is shown with a cleaning axis β. Exemplary bolt 500, including the threads 504, may be considered the "elongated workpiece", and is the workpiece worked upon by the prior art within the field.

In the exemplary embodiment, the concrete surface area 506 adjacent to the bolt 500, extending outward to the surface workpiece area diameter Da, is another "workpiece", more specifically a "surface workpiece", for the present thread cleaner 10. In an exemplary embodiment of the thread cleaner 10, with an abrasive module 120 having the diameter equivalent to the surface workpiece diameter Da, the abrasive module 120 may abrade the concrete surface area 506 when the thread cleaner 10 is positioned over the bolt 500, such that axis α and axis β align, and the abrasive surface 126 is pushed firmly against the concrete surface area 506.

In the exemplary embodiment, the drive end 102 may have a leverage notch to interface with an appropriate power tool, such as drills, grinders, or other rotary power devices. An exemplary embodiment may to a hole saw arbor, but other suitable attachment methods may be used.

In use, lowering the thread cleaner 10, with or without a power drive tool attached, over the threaded rod 500, teeth 124 of the scraping module first contacts the excess concrete on the bolt 500. These teeth 124 may have points arranged around the internal diameter Dt such that the tips of the teeth 124 are just slightly larger than the outside diameter of the threaded rod or bolt 500 to be cleaned. The number of teeth 124 in the exemplary embodiment is three, however, other numbers, may be suitable.

In use, an operator will guide the bolt 500 into the core entrance 110, and the hollow cylinder 106 may extend down over the threaded bolt 500 at a feed rate and rotational speed chosen by the operator to obtains the chosen results. This may depend on the threaded rod 500 diameter and the amount and hardness of material to be cleaned off. After teeth 124 have passed over the threads 504, the brushes 122 of the brush section 30 may contact the threads 504. This brushing action, produced by rotating the thread cleaner 10, performs a final cleaning on the threads 504.

In use, once the thread cleaner 10 has been lowered fully over the bolt 500 and all the threads 504 have been cleaned, the abrasive section 40 may contact the surface workpiece area 506, which extends outwardly from the bolt to diameter Da. It may be seen as advantageous to have this surface 506 around the stud 500 as smooth and flat as possible. Rotation of the thread cleaner 10 with the abrasive surface 126 in contact with the surface workpiece area 506, with some downward pressure applied by the operator, may effectively grind the surface 506 smooth and flat.

The foregoing disclosure and description of the invention are illustrative and explanatory thereof. The examples contained in this specification are merely possible implementations of the current device, and alternatives to the particular features and elements may be changed without departing from the spirit of the invention. The present invention should only be limited by the following claims and their legal equivalents, since the provided exemplary embodiments are only examples of how the invention may be employed and are not exhaustive.

I claim:

1. A thread cleaner, comprising:
   an elongated body with a drive end and an open end;
   the elongated body having a length from the drive end to the open end;
   a central axis through the length of the elongated body;
   the elongated body having a flange distal the drive end;
   an abrasive module, a scraper module, and a brush module distal the drive end;
   the scraper module having at least one tooth oriented to impart a forceful scraping action to an elongated workpiece positioned within the open end;
   the brush module functionally positionable within the elongated body with the bristles extending inwardly toward the central axis;
   the scraper module adjacent to the brush module and functionally positionable within the flange; and
   the abrasive module securable to the flange opposite the brush module.

2. The thread cleaner of claim 1, further comprising:
   the brush module being removeable from within the elongated body.

3. The thread cleaner of claim 1, further comprising:
   the abrasive module comprising an abrasive surface opposite the flange.

4. The thread cleaner of claim 3, wherein the abrasive module further comprising:
   the abrasive surface positioned on a plurality of raised surfaces projecting away from the flange and separated by a plurality of gaps.

5. The thread cleaner of claim 4, wherein the abrasive module further comprising:
   the abrasive surface coated with an abrasive material.

6. The thread cleaner of claim 5, wherein the abrasive material is selected from the group consisting of diamond, carbide, carborundum, boron carbide, garnet, quartz, crocus, emery, aluminum oxide, zirconia alumina, ceramic alumina, silicon carbide, and ceramic aluminum oxide, and mixtures thereof.

7. The thread cleaner of claim 1, further comprising:
   the scraper module and brush module oriented to apply tangential scraping force and tangential brushing force, respectively, to an elongated workpiece positioned within the open end and in alignment with the central axis; and
   the abrasive module oriented to apply abrasive force perpendicular to the central axis and away from the drive end.

8. The thread cleaner of claim 1, further comprising:
   the drive end having a power tool interface to receive a power tool that may impart rotation about the central axis.

* * * * *